No. 756,393. PATENTED APR. 5, 1904.
D. McCAUSLAND.
WHEEL GUARD OR FENDER.
APPLICATION FILED DEC. 1, 1903.
NO MODEL.
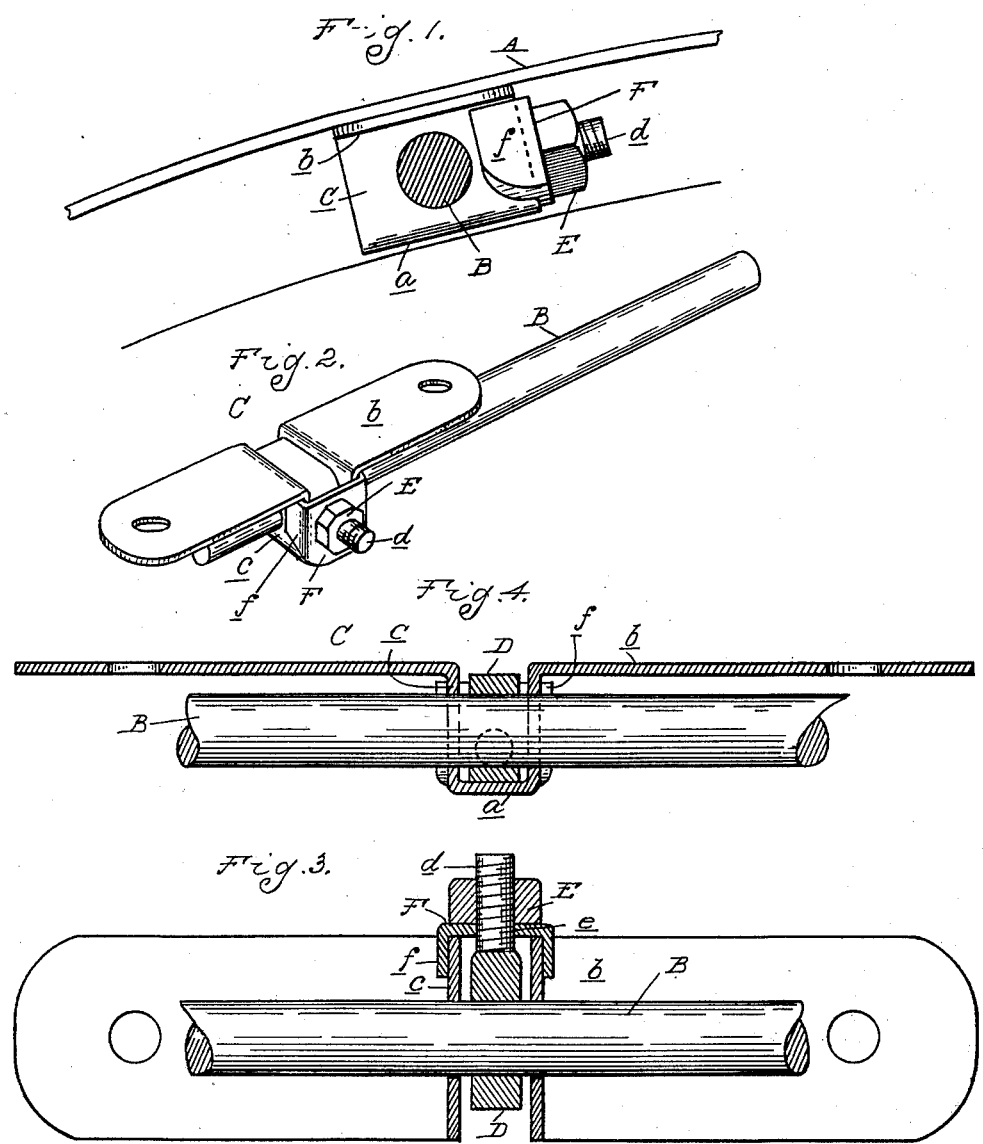
Witnesses
Geo. H. Grave
Jas. P. Barry
Inventor
David McCausland
By James Whittemore
Atty.

No. 756,393.

Patented April 5, 1904.

UNITED STATES PATENT OFFICE.

DAVID McCAUSLAND, OF DETROIT, MICHIGAN, ASSIGNOR TO BRISCOE MANUFACTURING COMPANY, OF DETROIT, MICHIGAN, A CORPORATION OF MICHIGAN.

WHEEL GUARD OR FENDER.

SPECIFICATION forming part of Letters Patent No. 756,393, dated April 5, 1904.

Application filed December 1, 1903. Serial No. 183,409. (No model.)

*To all whom it may concern:*

Be it known that I, DAVID McCAUSLAND, a citizen of the United States, residing at Detroit, in the county of Wayne and State of Michigan, have invented certain new and useful Improvements in Wheel Guards or Fenders, of which the following is a specification, reference being had therein to the accompanying drawings.

The invention relates to wheel guards or fenders; and it consists in the construction as hereinafter set forth.

In the drawings, Figure 1 is a diagram elevation showing a guard or fender to which my improvement is applied. Fig. 2 is a perspective view of the parts constituting the securing means for the fender. Fig. 3 is a bottom plan view, partly in section; and Fig. 4 is a longitudinal section.

A is the guard or fender, and B is a shank for securing the same to the body of the vehicle or other support.

C is a bifurcated bearing secured to the under side of the fender A and preferably formed from sheet metal struck up with a central U-shaped portion $a$ and laterally-extending securing-flanges $b$. The sides $c$ of the U-shaped portion are apertured for the passage of the shank B.

D is a clamping member engaging the shank B intermediate the furcations of the bearing. As shown, this comprises an eyebolt having a threaded shank $d$, which is arranged to extend laterally outward beyond the sides of the portion $c$ of the bearing.

E is a nut engaging the threaded portion of the shank $d$, and F is a clip-plate apertured at $e$ to engage with the shank $d$ and having flanges $f$ for embracing the sides $c$.

The parts being constructed as described, the fender may be secured in position by first engaging the shank B with the bifurcated bearing and threading it through the eyebolt D between the furcations of said bearing. The nut E may then be turned to draw the shank $d$ outward and in so doing clamps the shank B in the bifurcated bearing.

It will be understood that the guard may be readily adjusted either laterally or in angular relation to the wheel by simply loosening the nut E, which will permit of sliding the bearing C upon the shank B or swiveling it thereon.

What I claim as my invention is—

1. The combination with a wheel guard or fender and a supporting-shank therefor of a bifurcated bearing upon the under side of said guard, adapted to receive said shank a clamping member engaging said shank intermediate the furcations of said bearing and extending laterally outward therefrom, and means for clamping or loosening said member from the outer end thereof.

2. The combination with a wheel guard or fender and a supporting-shank therefor of a bifurcated bearing on the under side of said guard, an eyebolt sleeved on said shank intermediate the furcations of said bearing, and extending laterally outward therefrom, and a clamping-nut having a threaded engagement with the outer end of said bolt and drawing against the edges of said bifurcated bearing.

3. The combination with a wheel guard or fender and a supporting-shank therefor, of a bifurcated bearing on the under side of said guard with which said shank engages, an eyebolt sleeved on said shank intermediate the furcations of said bearing, and extending laterally outward therefrom, a clip-plate engaging the outer end of said bolt and embracing the edges of said bearing, and a clamping-nut having a threaded engagement with the outer end of said bolt.

4. The combination with a wheel guard or fender, and a supporting-shank therefor, of a bifurcated bearing formed of a sheet-metal stamping having a downturned U-shaped portion, the sides of which are apertured in alinement for the passage of said shank, an eyebolt sleeved on said shank intermediate the sides of the U and extending laterally outward therefrom, a clip-plate engaging the outer end of said eyebolt and embracing said sides of the U and a clamping-nut having a threaded engagement with said eyebolt.

In testimony whereof I affix my signature in presence of two witnesses.

DAVID McCAUSLAND.

Witnesses:
FRANK BRISCOE,
BENJAMIN BRISCOE.